USD005510618A

United States Patent [19]
Blecha et al.

[11] Patent Number: 5,510,618
[45] Date of Patent: Apr. 23, 1996

[54] SECOND GENERATION FLIR COMMON MODULES

[75] Inventors: Bill A. Blecha, Springfield; Thomas Coty, Alexandria; John J. Curry, Alexandria; Howard T. Graves, Alexandria; Robert C. Guckian, Alexandria; John M. Hall, Alexandria; Samuel B. McDowell, Garrisonville; Steve H. Nguyen, Fairfax Station; Raemon N. Samuels, Fairfax City; Thomas E. Smith, Woodbridge; Joseph J. Wiedmann, Springfield; Richard A. Wright, Stafford, all of Va.

[73] Assignee: The United States of America as represented by the Secretary of the Army, Washington, D.C.

[21] Appl. No.: 264,280

[22] Filed: Jun. 23, 1994

[51] Int. Cl.⁶ ...................................................... H04N 5/33
[52] U.S. Cl. .......................................... 250/332; 250/334
[58] Field of Search ...................................... 250/332, 334

[56] References Cited

U.S. PATENT DOCUMENTS

| | | | |
|---|---|---|---|
| 4,728,804 | 3/1988 | Norsworthy | 250/334 |
| 4,806,761 | 2/1989 | Carson et al. | 250/334 |
| 4,910,401 | 3/1990 | Woods | 250/334 |
| 4,935,629 | 6/1990 | Livermore et al. | 250/332 |
| 5,343,040 | 8/1994 | Wiese et al. | 250/334 |

Primary Examiner—Carolyn E. Fields
Attorney, Agent, or Firm—Milton W. Lee; Alain L. Bashore; John E. Holford

[57] ABSTRACT

An improved modular FLIR system is provided that fits in the same space envelopes that were provided for the Army's GEN I FLIR's. The resolution is more than doubled by using a narrow two dimensional array of Hg-Cd-Te detectors with pn junctions as a time-delay-integration line sensor, improved optics and analog-digital conversion with image enhancement.

10 Claims, 4 Drawing Sheets

SECOND GENERATION FLIR COMMON MODULES

BACKGROUND OF THE INVENTION

1. Field of the Invention

The present invention generally relates to Forward Looking Infrared (FLIR) Imaging Systems as used by the U.S. Army and other military or civilian organizations.

2. Description of Prior Art

The Army has adopted a first generation (GEN I) common module approach for the production and fielding of Forward Looking Infra-Red sensors (FLIR's). This concept provides common access to core FLIR components in order to reduce costs and facilitate maintenance, but yet still allows system integrators the flexibility of configuring each particular sensor to individual needs. There are several shortcomings to the common module concept, however. Due to the variety of sensor requirements and technology improvements, each common "module" evolved into a family of modules and thus complicated supply and repair logistics. Expensive module interfaces have been developed for each sensor platform. Centralized universal upgrades have not been possible. The performance of each sensor is often very different from any other, thus complicating training and strategic deployment. Many improvements in the technology of infra-red sensing and imaging have since been made to the extent that it is neither cost effective nor physically possible to modify GEN I Common Module FLIR sensors to achieve enhanced performance. Rather the state of the art is now such that a new generation of FLIR sensors must be established. Examples of these technology advancements include the availability of multi-element photovoltaic (PV) focal plane arrays, time-delayed-integration (TDI) for enhanced sensitivity, miniaturized electronic multiplexer circuitry, digital video image processing, improved cryogenic cooling, long lifetime unidirectional scanners and integrated laser-hardened optics. Advances have also been made in the creation of two dimensional staring arrays which do not require field-of-view scanning, but the general consensus is that this technology is too immature to match the performance of the proposed new GEN II scanning FLIR sensor system, to be described. It has been determined that the Army would greatly benefit from the development of a new Kit concept, wherein GEN II FLIR technology is fielded in the form of preassembled kits ready to install into at least three general categories of Army FLIR environments, large Attack Helicopters, Tanks or Armored Vehicles, and smaller Scout class vehicles.

SUMMARY OF THE INVENTION

According to the invention, all of the Army's current FLIR sensor needs can be met by supplying three new FLIR kits. These kits will provide better resolution, countermeasure resistance, video processing, and data transfer than the first generation FLIR's and will support either digital or analog processors. The first Kit, designated as Night Vision (NV)-80, will serve all major ground vehicle systems such as tanks, missile launchers, augmenting viewers, sights and intelligence gathering equipment. The second kit, designated as NV-81, is designed for turreted helicopter aircraft like the Apache and Comanche requiring wide, pilotage application fields of view. A third kit, designated NV-82, is designed for aircraft with turrets having wide apertures or three-way fields of view, also common to Apache and Comanche aircraft that use FLIR sensors for targeting applications. Certain modules within these kits that will be designed to be mixed and matched, thus permitting them to serve a wide range of requirements that may arise in the future.

One object of the invention is to provide FLIR kits having reliable and enhanced performance complying with efficient new predefined envelopes and interfaces for the Army's and other services' second generation of Night Vision equipment.

A further object of the invention is to provide a minimum of kits formed from a minimum number of components or modules to meet all the current needs of the Army.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
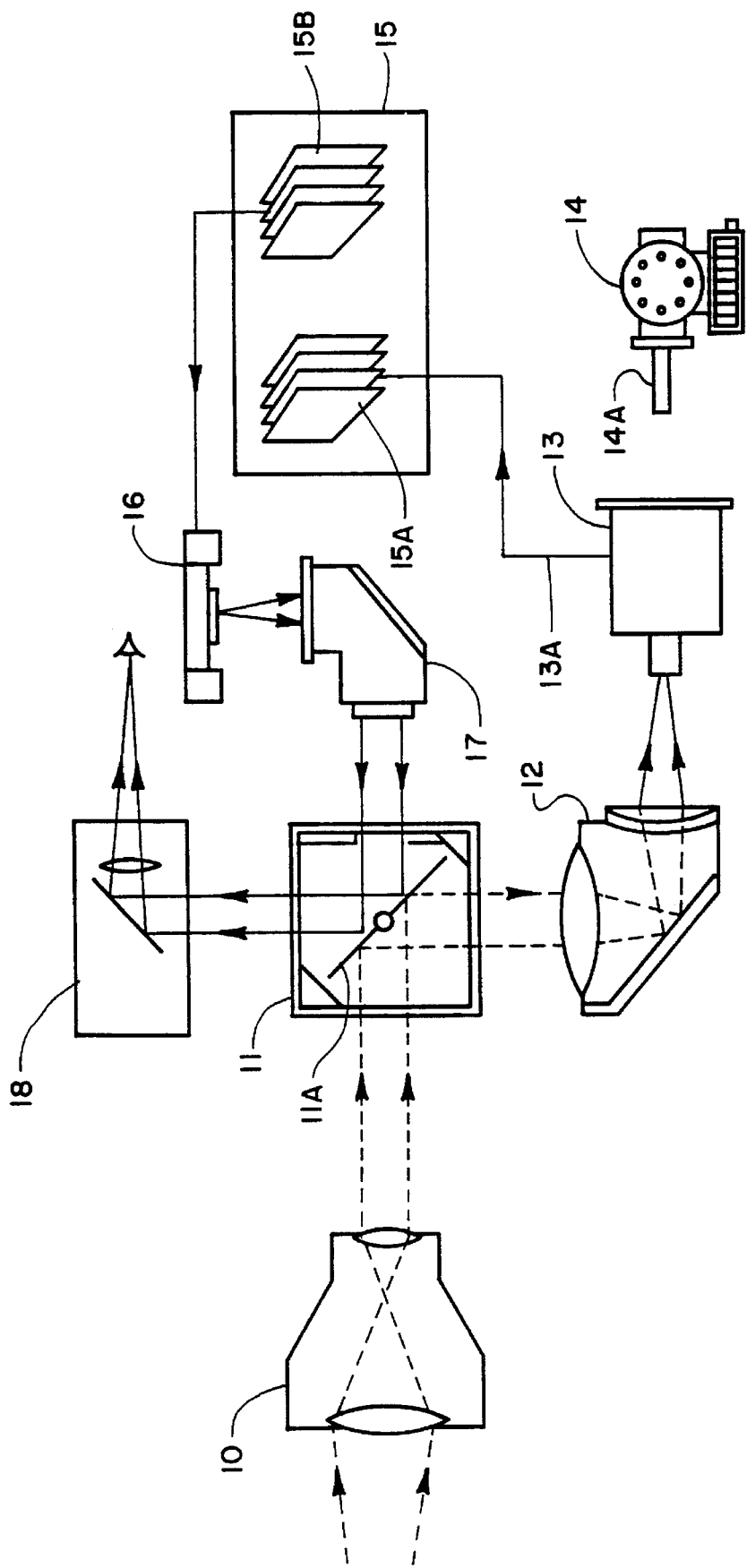
FIG. 1 is a pictorial view of a prior art GEN I Forward Looking Infrared (FLIR) imaging system based only on standard modules.

As illustrated in FIG. 1, the U.S. Army currently uses First Generation (GEN I) FLIR common modules in nearly all major sensor platforms today. A platform is a support placed on a weapon system, a surveillance system, a vehicle or any combination of these systems to which FLIR sensor modules may be conveniently attached. The Afocal Assembly 10 is considered to be part of the platform, for example this assembly may be fixed mounted unit initially provided for a daylight sight or gun camera. Outfitting the assembly with IR lenses in the 8 to 12 micron range, hereafter referred to as far-infrared readies it for FLIR use.

The scanner module 11 contains an oscillating mirror 11A that provides operates at 30, 45, or 60 cps. The IR radiation after being reflected about 90° by the scanner mirror is passed to an IR imager module 12, which focuses the scanned image of the scene, gathered by the afocal, through an IR window onto a small array chip or sensor mounted in a dewar module 13. The sensor or detector is a linear array of discrete light sensitive electronic elements, oriented normal to the optical axis and the direction of scan, e.g. vertical to a horizontal scan. As the scanner pans this array across the horizontal field of view, the electronics read out an entire two dimensional FOV within the time frame of one scan. A slight relative rotation or nodding motion of the scanner between scans is used to provide mechanical interlace. Interlace lines are produced by each successive scan. The scanner can snap back to its initial position (Uni-Directional) after a complete scan or generate a reverse scan (Bi-Directional) to return to that position. To provide a useable S/N value, the chip is cooled by a cryogenic dewar module 14 with a cold finger 14A that extends through the dewar to gently touch the chip and extract heat from it.

Figure 2:
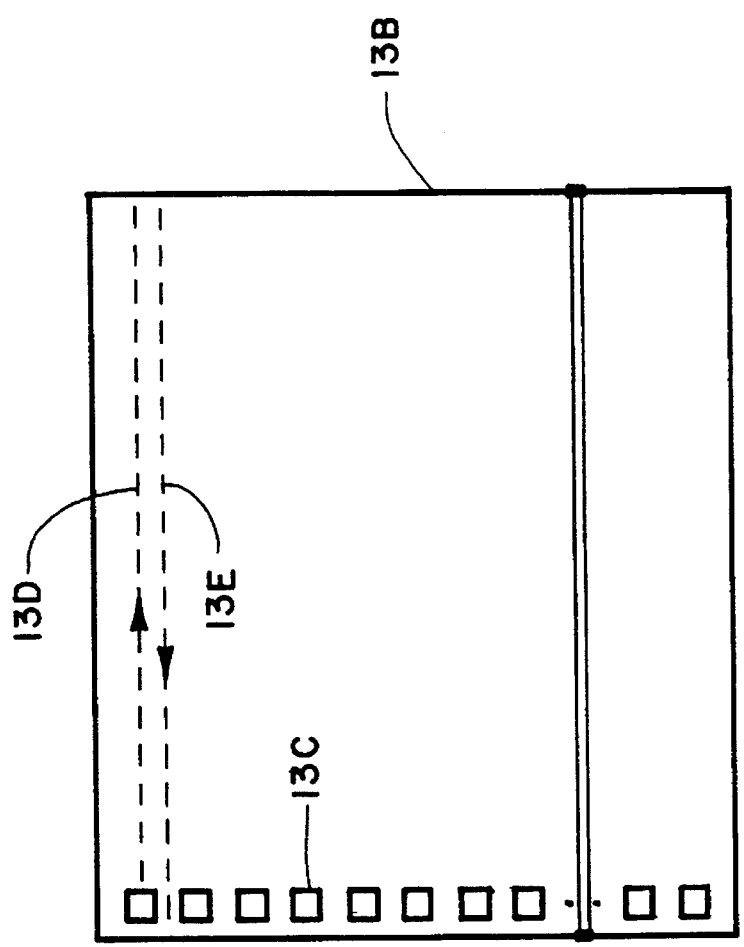
FIG. 2 is a front view of a detector line array as used in above GEN I system.

As shown in FIG. 2, the detector chip 13B carries a line array of far-infrared detectors 13C that produce 160, 320 or 480 resolution lines generated in parallel. Each detector output is interfaced with an input on a different preamplifier 15A and post amplifier 15B in an electronics module, usually through a harness 13A. Integrated circuits in this module provide the preamps, postamps and sometimes simple logic circuits to compensate for image distortion. Dotted line 13D denotes the motion of an IR image pixel on the forward scan of the imager and dotted line 13E indicates the motion of the same pixel during the return scan.

Referring again to FIG. 1, the electronics module has an output for each line post-amplifier 15B to interface a Light Emitting Diode (LED) module 16. An LED is provided for the postamplifier of each detector in the Dewar Module. The LED's thus mirror the responses of the photodiodes as a visible light line image. Reflecting the light from the LED's about 90° using the back of the vibrating mirror 11A recreates the field-of-view (FOV) of the image from the Afocal Assembly in visible light. A Binocular Eyepiece Module 18 is commonly placed in the path of the recreated image reflecting it to a convenient viewing angle and imaging the scene for a human eyes. The electronics module may also include integrated circuits with a single output to delay and reformat the detector signals into a video signal like that used in standard television.

Such modules, or common modules in the first generation, are part of a family that includes the standardized modules in the Module Table below. Each user purchases the standardized or specialized modules required for his mission; combines them and installs the necessary platform to interface his system, e.g. a man portable system, a land vehicle, a marine vessel, or an aircraft. A few man-portable systems have escaped the modular concept in order to reduce their weight, since they are inherently simple low resolution systems. Vehicle systems, on the other hand, tend to become more complex high resolution systems that benefit from the modular approach. Numerous improvements have been made in the technologies that govern the make up of the modules, some of which have been compromised to meet current module criteria and others have been shelved until these module constraints are removed. Similarly, technological advancements and improved system performance requirements demand a more integrated approach to interfacing these new modules. This has reached a state that warrants a new second generation of kits composed of new modules.

| Module Table for GEN-1 FLIR | |
|---|---|
| DESCRIPTION | NUMBER |
| Preamplifier Video | AM-6923/UA |
| Postamplifier - Control Driver | AM-6924/UA |
| Regulator, Voltage, Bias (Large 5 volt) | CN-1503/UA |
| Regulator, Voltage, Bias (Small 3 volt) | CN-1559/UA |
| Auxiliary Control, Video | PL-1402/UA |
| Scan-Interlace (Small, 30 Hz) | PL-1403/UA |
| Scan-Interlace (Small, 30 Hz) | PL-1403A/UA |
| Scan-Interlace (Large, 40–60 Hz) | PL-1408/UA |
| Detector - Dewar (Small, 60 element) | DT-591A/UA |
| Detector - Dewar (Large, 120 element) | DT-617A/UA |
| Detector - Dewar (Large, 180 element) | DT-594/UA |
| Detector - Dewar (Large, 180 element) | DT-594A/UA |
| Cooler, Cryogenic Mechanical (1W Low Vib) | HD-1033B/UA |
| Cooler, Cryogenic Mechanical (1w Low Vib) | HD-1033C/UA |
| Cooler, Cryogenic Mechanical (Split .25w) | HD-1045(V)/UA |
| Cooler, Cryogenic Mechanical (Split 1W) | HD-1111(V)/UA |
| Cooler, Cryogenic Mechanical (Integ. .25) | HD-1132(V)/UA |
| Cooler, Cryogenic Mechanical (Integ. 1W) | Not Assigned |
| Scanner,Mechanical | MX-9872(V)1/UA |
| Scanner,Mechanical | MX-9872(V)2/UA |
| Scanner,Mechanical | MX-9872(V)3/UA |
| Scanner,Mechanical | MX-9872(V)4/UA |
| Scanner,Mechanical | MX-9872(V)5/UA |
| Scanner,Mechanical | MX-9872(V)6/UA |
| Light Emitting Diode Array (180 element) | SU-96/UA |
| Light Emitting Diode Array (120 element) | SU-122/UA |
| Light Emitting Diode Array (90 element) | SU-127/UA |
| Imager, Optical (Small) | SU-97/UA |
| Imager, Optical (Small) | SU-97B/UA |
| Imager, Optical (Large) | SU-103/UA |
| Imager, Optical (Large) | SU-103A/UA |
| Imager, Optical (Large) | SU-121/UA |
| Collimator, Visual (Small) | SU-98/UA |
| Collimator, Visual (Large) | SU-102/UA |

Figure 3:
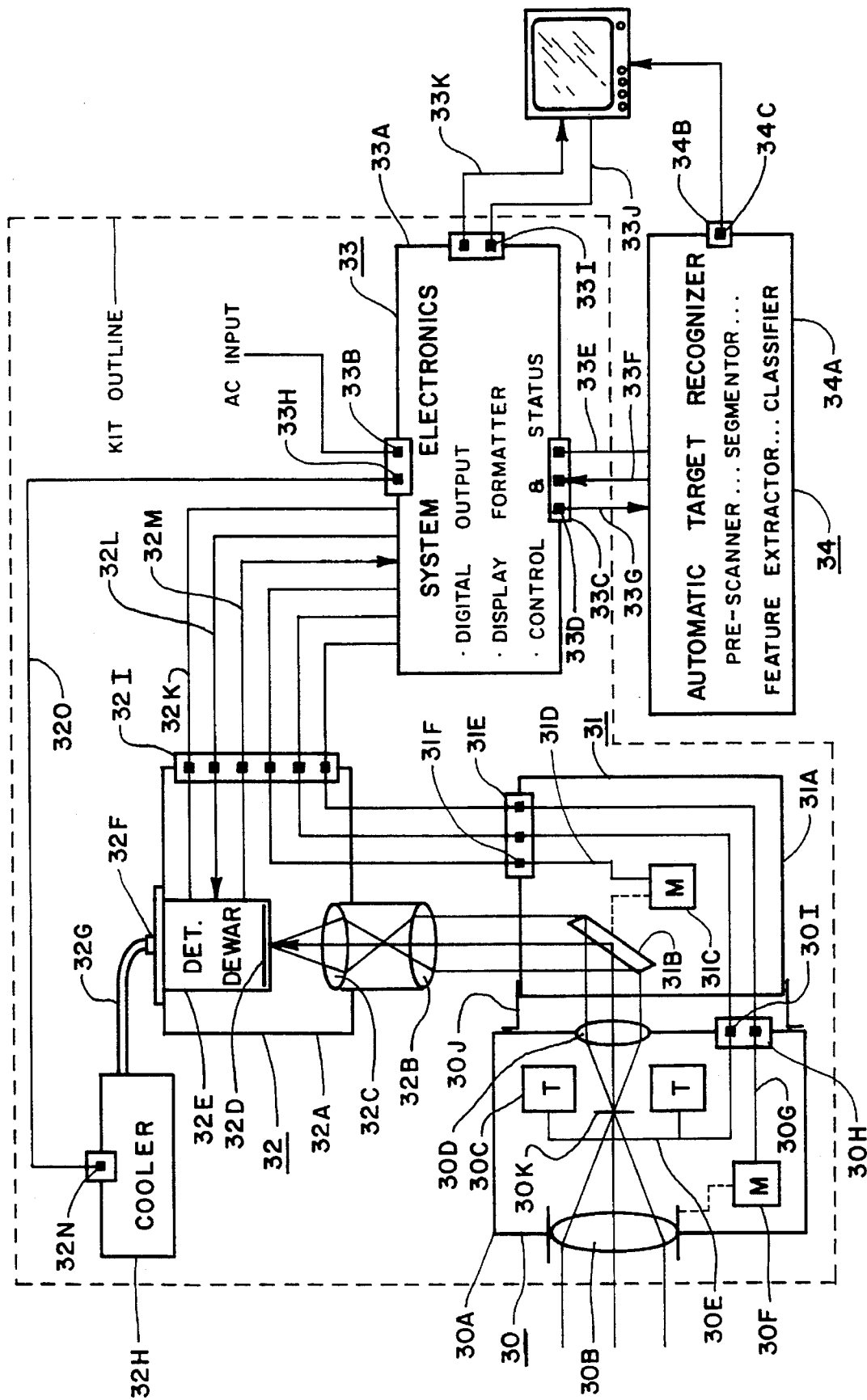
FIG. 3 is a pictorial view of a GEN II system that will replace the system in FIG. 1.

Referring now to FIG. 3, there is shown, in a pictorial block diagram, the components of a GEN II IR imaging kit. At present, only components within the dashed outline are to be parts of this kit, future requirements may require that ATR's and digital enhancement modules be included as well. The first component or module 30 has a first housing 30A that contains the afocal lens system. This system includes an objective lens 30B to gather light from a distant scene and/or target object. The scene is first lo focused on an intermediate focal plane within the module that contains a number of thermal references 30C. The light from the scene image and references is gathered by a collimating lens 30D and emerges as parallel rays focussed at infinity. The lenses require special materials and treatment to reduce absorption of the far-infrared, which not only reduces available flux but also heats up modular components causing malfunctions. The focal plane references require a regulated d.c. input and a control feedback loop to the imaging system to perform their function furnished by one or more leads like lead 30E. This focal plane is also an excellent plane in which to place a filter 30K to prevent overloading the detectors or provide better discrimination of certain targets. Rotating filter wheels with many filters are often used to analyze atmospheric contaminants and these may inserted in the focal plane and coupled to a System Electronics Component, to be described, by signal leads like 30E. The lenses may include a motorized focussing mechanism 30F and thus require a similar d.c. input lead 30G with reversible polarity for remote focussing. The mechanical coupling or interface between the first and second modules thus requires a circular stop opening for the collimated output image beam and half of a first electrical connector 30H with two pairs of mating contacts, like contact 30I insulated from the module housings which are commonly grounded. The interfaces between all modules may be the usual bolted flange type, like 30J with gaskets to seal out grit particles and caustic atmospheric agents. The lenses or a thin planar window may be provided as seals for the optical openings in the module housings when separated. Electrical connectors are sealed through by their insulation or suitable grommets.

The second component or module 31 is enclosed in a second housing 31A the wall of which either contains the mating portion of said first connector or has leads sealed through the wall to it. Similar connectors will be noted between successive modules as this description proceeds. The housing 31A encloses a mirror type scanner 31B driven by a synchronous motor 31C. Unlike the scanner in first generation modules, this scanner scans in one direction only (i.e. unidirectional mode). The rate of scanning is chosen to be 30, 45 or 60 cycles per second to match electronics modules to be described presently. The mirror may thus be one of n facets of a quiet and smooth running synchronized rotor spinning at 30/n 45/N or 60/n cycles per second. The mirror can also scan slowly and snap to its initial position to produce each scan, if desired. To maintain mirror motor synchronicity this module requires at least a single phase motor input lead 31D carrying current with a frequency related to 15 cps, and might obviously benefit from two or three such phase input leads. The interface between the second and third modules must then include a stop aperture at least the height and twice the width of that between the first and second modules. It also must provide half of a connector 31E with the same number of insulated terminal pairs like pair 31F for dc and at least one terminal pair per phase of the motor input.

The third component or module 32 has a third housing 32A that contains an imaging lens system. A decollimating lens 32B focusses the collimated beam into an image of the scene plus references at a second focal plane, which like the first provides a good location for special filters, if desired. An ocular lens 32C matches the image size to an array 32D of photodiodes. These photodiodes are by nature photovoltaic devices which are defined in Webster's Ninth New Collegiate Dictionary, Copyright 1985, as being "of, relating to or utilizing the generation of a voltage when radiant energy falls on the boundary between dissimilar substances (as two different semiconductors)". It is well known that HgCdTe photodiodes are photovoltaic devices and this is evidenced by the terminology used in U.S. Pat. No. 4,318, 217 entitled "METHOD OF MANUFACTURING AN INFRA-RED DETECTOR DEVICE" granted to Michael D. Jenner, et al. 9 Mar. 1982.

Figure 4:
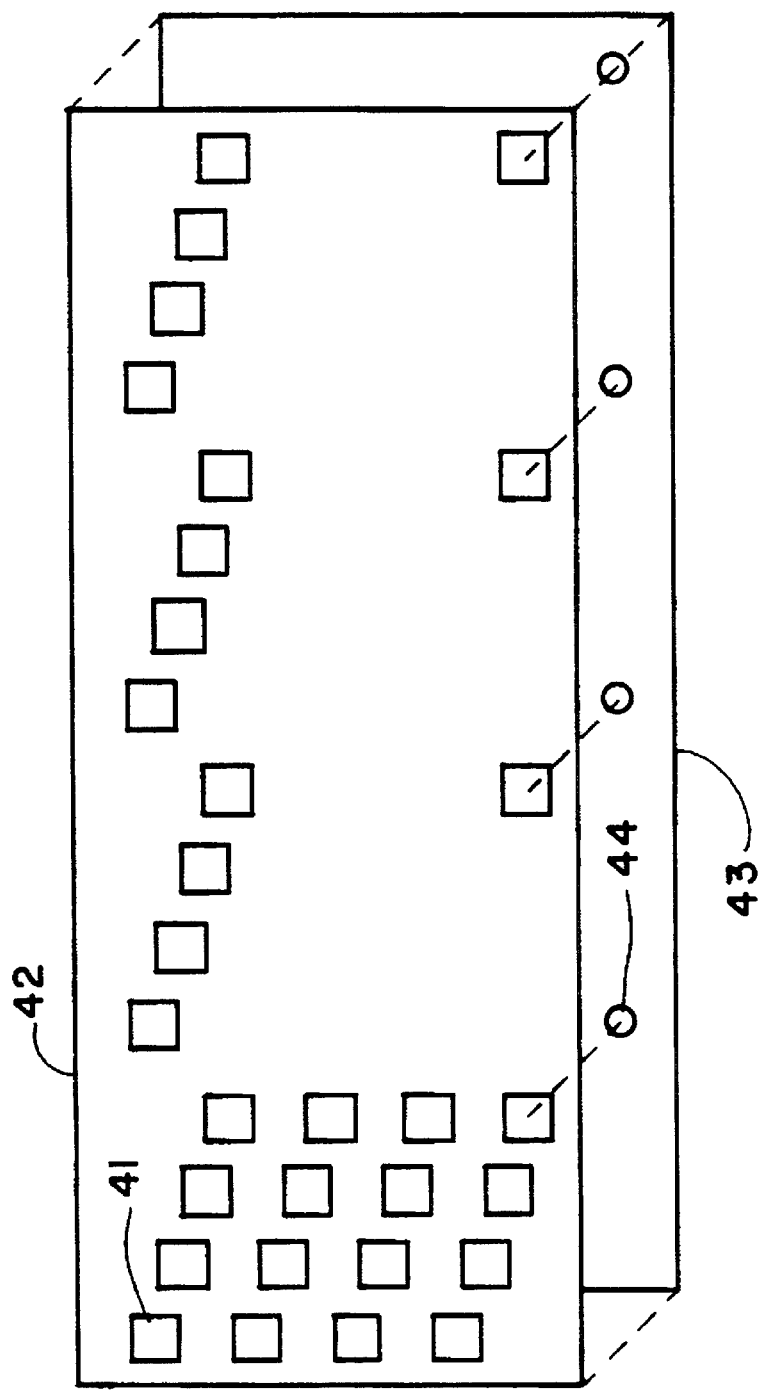
FIG. 4 is an exploded view of a two dimensional detector array as used in above GEN II system showing the kit within a dashed outline.

As shown in FIG. 4, the diodes 41 are square and arranged on a Hg-Cd-Te chip 42 in vertical rows normal to the direction of image motion, e.g. horizontal motion, with vertical spaces between diodes equal some fraction of the diodes' height. The diodes in subsequent rows in the direction of image motion are displaced a fraction of the width of a diode forming a set of four or more different rows. This pattern is repeated n times to secure an increase in the signal to noise ratio of $n^{-2}$. Chip 42 is mounted on a silicon based chip 43 carrying a charge-coupled-circuit (CCD) by means of solder bead connectors 44 having the same pattern as the photodiodes, i.e. one for each diode. When heated and pressed together the silicon chip receives the photodiode outputs from the Hg-Cd-Te chip and, when driven by a clock signal at the scan frequency of the second module, samples the photodiodes and formats their outputs into parallel and/or series type analog video type line output signals. Parallel readouts will of course involve increased output leads, e.g. one lead per line of the image. This array will generate 480 lines per scan or a 960 line interlaced frame.

Returning to FIG. 3, a special dewar 32E is required for this array, a suitable embodiment of which is described in patent application Ser. No. 08/176,866. The dewar must have an easily removable IR window to provide access to the detector array without removing the cold finger mounting to which it is attached. The dewar is a thin glass structure easily damaged by the metal cold finger. This module must have a thermally insulated tubular fitting 32F that mounts through the module wall and the wall of the dewar. The exterior end of the fitting couples to a section of cryogenic tubing 32G and this in turn couples to a cryogenic cooler 32H attached to the base of the module housing. Cooling requirements vary with the size and sophistication of the chip. Balanced split cycle coolers from 0.25 to 1.75 watts, using helium as a coolant, are readily available in the art. A portion of the wall of this module is apertured to receive the remaining half of the second connector and half of a third electrical connector 32I. The third connector carries terminal pairs, like pair 32J, wired to matching terminal pairs of the second connector. In addition it carries a terminal pairs for a dc voltage lead 32K, a clock voltage input lead 32L and a video output lead 32M for the line outputs from the silicon chip. The cooler has its own connector with terminal pair 32N for a power lead 32O.

The fourth component or module 33 has a fourth housing 33A that contains the electronic controls that feed the detector and reformat its output. The wall of this module is apertured for a standard input connector 33B supplying primary power such as n-phase 110 v 60 cps or other common power sources. This power is transformed into low voltage regulated ac and dc outputs and clock pulse outputs. The above module wall is also apertured to receive half of the third connector. Appropriate ones of the above ac outputs are coupled to the third connector to power the focussing and scan motors. A dc and clock signal in is supplied integrated circuits like the photodiode array and charge-coupled-device (CCD) that samples the photodiodes. They are also coupled to fourth module components such as preamps and postamps for the CCD outputs, image enhancing circuits, analog video formatting circuits, and analog to digital converters and digital storage (control and status) devices. The above module wall is also apertured to receive half of a power connector 33H for the cooler, and half of a fourth connector 33C for an optional fifth module and a connector 33H for a TV type monitor of either analog or digital design. The fourth connector has terminal pairs like 33D for an ac Power lead 33E, a input interrogation signal lead 33F to access information in the digital storage devices and an output lead 33G to carry the information accessed to an optical device for further processing and/or use. The wall is further apertured to receive a monitor connector 33H having terminal pairs like 33I. One pair is coupled to an ac power lead 33J for the monitor and another pair is coupled to a video lead 33K which carries the accessed information from a display formatter to the monitor.

The above mentioned optional device, not now a part of the kit, may be an Augmented Target Recognition (ATR) device. Its wall would thus be apertured to receive the remaining half of the fourth connector. The ATR device includes Read-only-memories (ROM's) containing far infrared target signatures which form data banks on far-infrared target images. The ATR also has circuits known as segmenters wired to its half of the fourth connector in order to select specific portions of the digital data generated by the electronics in the fourth module. This device also includes comparators which compare these specific portions with the target signatures stored in the data banks to generate recognition probabilities, classification possibilities, risk factor presented by the target imaged by the FLIR and, if possible, proper responses, Numerous types of ATR's have been proposed, and many are designed to interface other systems such as radar and sonar. The purpose here is to provide a standard interface to such digital devices and analog devices like the TV type monitor. The latter requires a connector 34B with only one pair of terminals for a video lead to superimpose target symbols on the scene generated by the fourth module.

The three Field Kits to be provided will be designated as the NV-80, NV-81 and NV-82. The NV-80 is a specific second generation FLIR kit for use in land vehicles such as tanks, missile launchers and the like; the NV-81 is a second generation FLIR kit for pilot application use in aircraft; and the NV-82 is a complex second generation FLIR kit for use in aircraft with long range targeting sensors. The modules in each kit may vary slightly, but commonality is preserved when possible. The 80 model kit uses a detector with a one watt cooler, a non-interlace second module and optical modules that provide narrow (2 degree×3.6 degree) and medium (7.5×13.3) fields of view (FOV). All models use the same fourth module. The 81 kit uses an interlace scanner which captures 960 lines per frame twice that of the other kits. This kit uses optics for a very wide FOV (30×53.3). The 82 kit uses a detector designed for a 1.75 watt cooler. The resulting image is very free of noise and suitable for use with ATR's. The first module of this kit is designed to give an intermediate FOV (6×10.6) because it is intended to interface with another platform specific afocal assembly with multiple fields of view.

Having thus described my invention, what we claim as new and desire to secure by Letters Patent is as follows:

1. A second generation Forward Looking Infrared (FLIR) kit comprising
   a series of four modules, said modules having housings proportioned to fit within one of three geometric envelopes defined by spaces in Army vehicles that have been allotted to GEN I FLIR systems,
   the first two of said modules each having an optical axis with at least one variable far-infrared optical element along said axis, an optical input at one end of said axis for far-infrared radiation, at least one electrical input transducer coupled to each of said variable optical elements and external electrical inputs for dc and ac signals to energize the electrical transducers therein;
   the first and second of said modules having an optical output for said far-infrared radiation at the end of said axis opposite said one end;
   the third of said modules including an optical axis, an optical input at one end of that axis for far-infrared radiation, and external electrical inputs for dc and ac signals, said third module further including a dewar containing an array of mercury-cadmium-telluride far-infrared detectors with pn junctions, an input for cooling fluid circulated in said dewar and an electronic signal output connected to said detectors;
   the fourth of said modules having inputs and outputs for electronic signals only; and
   the respective pairs of said inputs and outputs being serially interconnected.

2. A kit according to claim 1 wherein the first of said modules includes:
   an afocal lens comprising said at least one variable optical element and a collimating lens between said optical input and output, said afocal lens having a focal plane wherein the image of a distant scene is focused, thermal references mounted in said focal plane along the periphery of said focused image, whereby said collimating lens simultaneously gathers, combines and collimates infrared radiation from said distant scene and said references into a narrowed beam at said optical output.

3. A kit according to claim 2 wherein the second of said modules includes:
   a scanning means comprising said at least one variable optical element between said optical input and output thereof to gradually displace said narrowed beam in only one scan direction normal to the optical axis of said beam for a distance about equal to the dimension of said narrowed beam in said scan direction and to restore said narrowed beam to its original position at the end of each scan.

4. A kit according to claim 3, wherein:
   said scanning means redirects the optical axis of said displaced narrow beam at a right angle.

5. A kit according to claim 3 wherein said third module includes:
   an ocular lens means substantially centered in said beam to focus a moving image of said scene and references on a focal plane in said third module;
   said array of detectors comprising a two dimensional image line sensing array of uniformly spaced far-infrared photodiodes mounted in said focal plane to form parallel rows, with n photodiodes in each row, n being orders of magnitude less than the number of rows, the rows being staggered and normally aligned with the direction of the image's motion to provide oversampled analog video response signals for time delay and integration; and
   a silicon based ccd integrated circuit means coupled with said array to produce photodiode output sampled signals in response to timed input clock signals, and to create analog video signals by delaying, shifting and integrating selected ones of said sampled signals.

6. A kit according to claim 5 wherein said fourth module includes:
   a video output terminal for a monitor with a video input; and
   an analog signal processor means coupled between the output of said third module and said video terminal to format video input signals for said monitor.

7. A kit according to claim 5 wherein said fourth module includes:
   an analog-to-digital converter means with an input coupled to the output of said third module to convert said analog video signals to digital video signals; and
   digital RAM storage means coupled to the output of said converter to store said digital signals.

8. A kit according to claim 7 wherein said fourth module includes:
   digital processors coupled between the output of said converter and the input of said storage means to enhance the image quality of said digital video signals.

9. A kit according to claim 5 wherein:
   said dewar surrounds said detectors and has an input tube to supply coolant, said dewar having a removable far-infrared window at one end covering said detectors, whereby said detectors can be removed without disassembling the detectors mounting structure from said dewar.

10. A kit according to claim 9 wherein said third module further includes:
    an electrically powered cooling means, using a low density gas coolant, to produce cryogenic coolant temperatures; said cooling means being attached to the end of said dewar opposite said one end.

* * * * *